(12) United States Patent
Hiestand

(10) Patent No.: US 8,955,852 B2
(45) Date of Patent: Feb. 17, 2015

(54) CLAMPING UNIT

(76) Inventor: Karl Hiestand, Pfullendorf (DE)

( * ) Notice: Subject to any disclaimer, the term of this patent is extended or adjusted under 35 U.S.C. 154(b) by 1158 days.

(21) Appl. No.: 12/807,729

(22) Filed: Sep. 13, 2010

(65) Prior Publication Data

US 2011/0068546 A1    Mar. 24, 2011

(30) Foreign Application Priority Data

Sep. 12, 2009    (EP) ...................................... 09011695

(51) Int. Cl.
     *B23B 31/26*      (2006.01)
     *B23B 31/175*      (2006.01)
     *B23B 31/28*      (2006.01)

(52) U.S. Cl.
     CPC ........... *B23B 31/16229* (2013.01); *B23B 31/28* (2013.01); *B23B 2260/062* (2013.01); *B23B 2260/07* (2013.01); *B23B 2260/128* (2013.01); *B23B 2270/38* (2013.01)
     USPC .............................. 279/134; 279/125; 82/165

(58) Field of Classification Search
     USPC ......... 279/134, 135, 126, 110, 114, 119, 141, 279/125, 115; 82/142, 165, 147, 168
     See application file for complete search history.

(56) References Cited

U.S. PATENT DOCUMENTS

| | | | | |
|---|---|---|---|---|
| 1,906,490 A | * | 5/1933 | Sloan et al. ..................... | 279/134 |
| 4,567,794 A | * | 2/1986 | Bald .............................. | 82/1.11 |
| 4,573,379 A | * | 3/1986 | Bald .............................. | 82/145 |
| 4,573,380 A | * | 3/1986 | Bald .............................. | 82/142 |
| 4,758,006 A | | 7/1988 | Hiestand | |
| 5,167,175 A | * | 12/1992 | Rohm ............................. | 82/142 |
| 8,146,467 B2 | * | 4/2012 | Taglang et al. .................. | 82/165 |
| 2006/0027980 A1 | * | 2/2006 | Hiestand ....................... | 279/119 |
| 2009/0072503 A1 | * | 3/2009 | Rohm ........................... | 279/130 |

FOREIGN PATENT DOCUMENTS

| | | |
|---|---|---|
| DE | 3709246 | 10/1988 |
| DE | 102007044309 | 3/2009 |
| EP | 0 272 394 | 6/1988 |

* cited by examiner

*Primary Examiner* — Eric A Gates
*Assistant Examiner* — Paul M Janeski
(74) *Attorney, Agent, or Firm* — Pandiscio & Pandiscio

(57) ABSTRACT

A clamping unit (1) for machine tools (2) with a housing (11) connected in a rotationally fixed arrangement with a machine spindle, (5) and a screw drive (13) that interacts with a draw rod (6) such that rotational movements are converted into translational movements, the housing (11) being provided with an output element by which rotational movements are transmitted to an actuator (21). The housing (11) has an input element in a rotating mounting, with the actuator (21) acting on the input element, and the input element (29) is in driving connection with a shaft (14) by means of intermediate elements (31), whereby to direct rotational movements of the machine spindle (5) via the clamping unit (1), and for adjustment movements of differently configured clamping devices, to be converted into axial adjustment movements and transmitted directly onto the draw rod (6). No complicated electrical control devices and programs are required for adjusting and adapting a power chuck (3) linked to the draw rod (3) to different operating conditions.

18 Claims, 4 Drawing Sheets

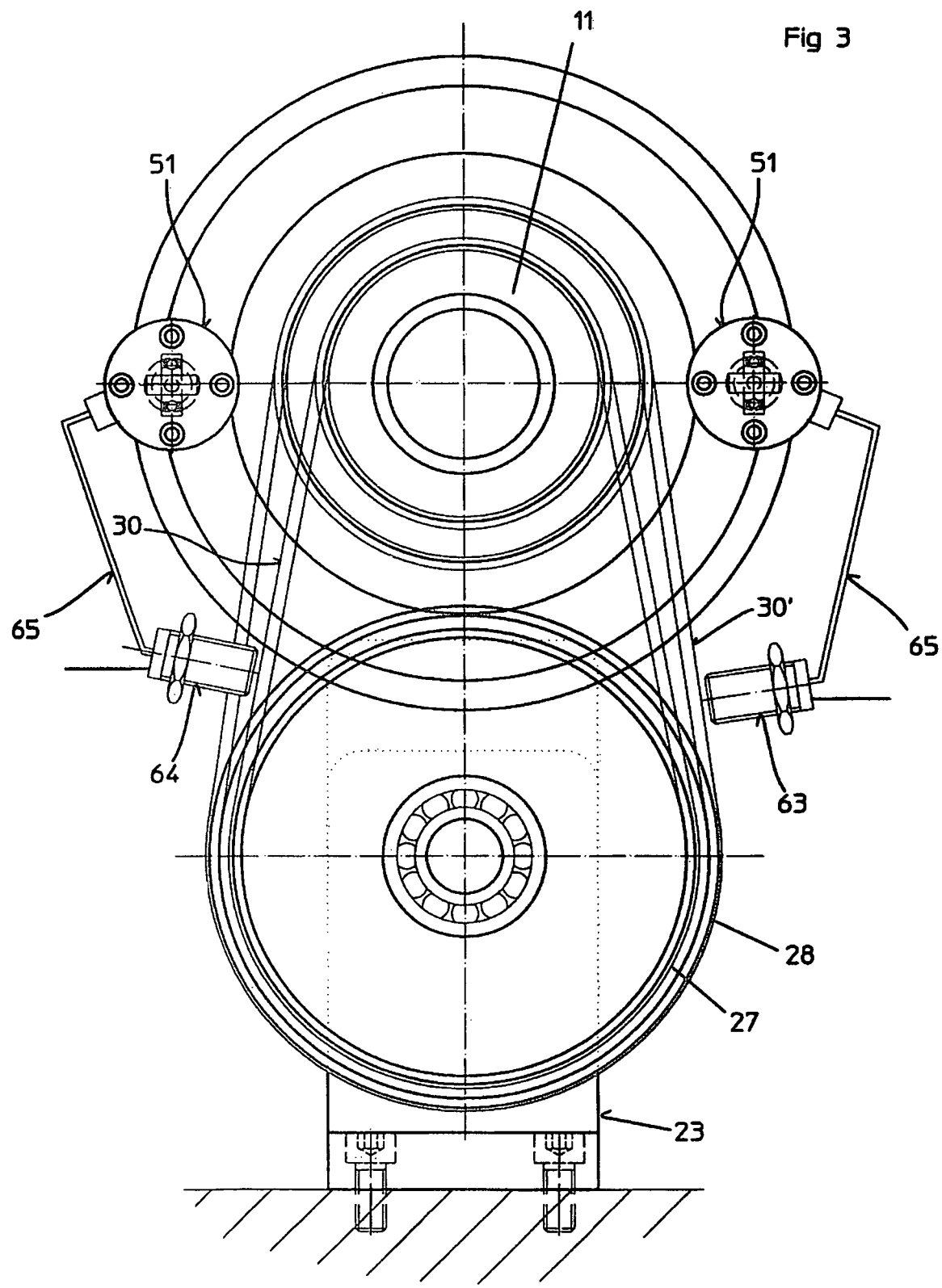

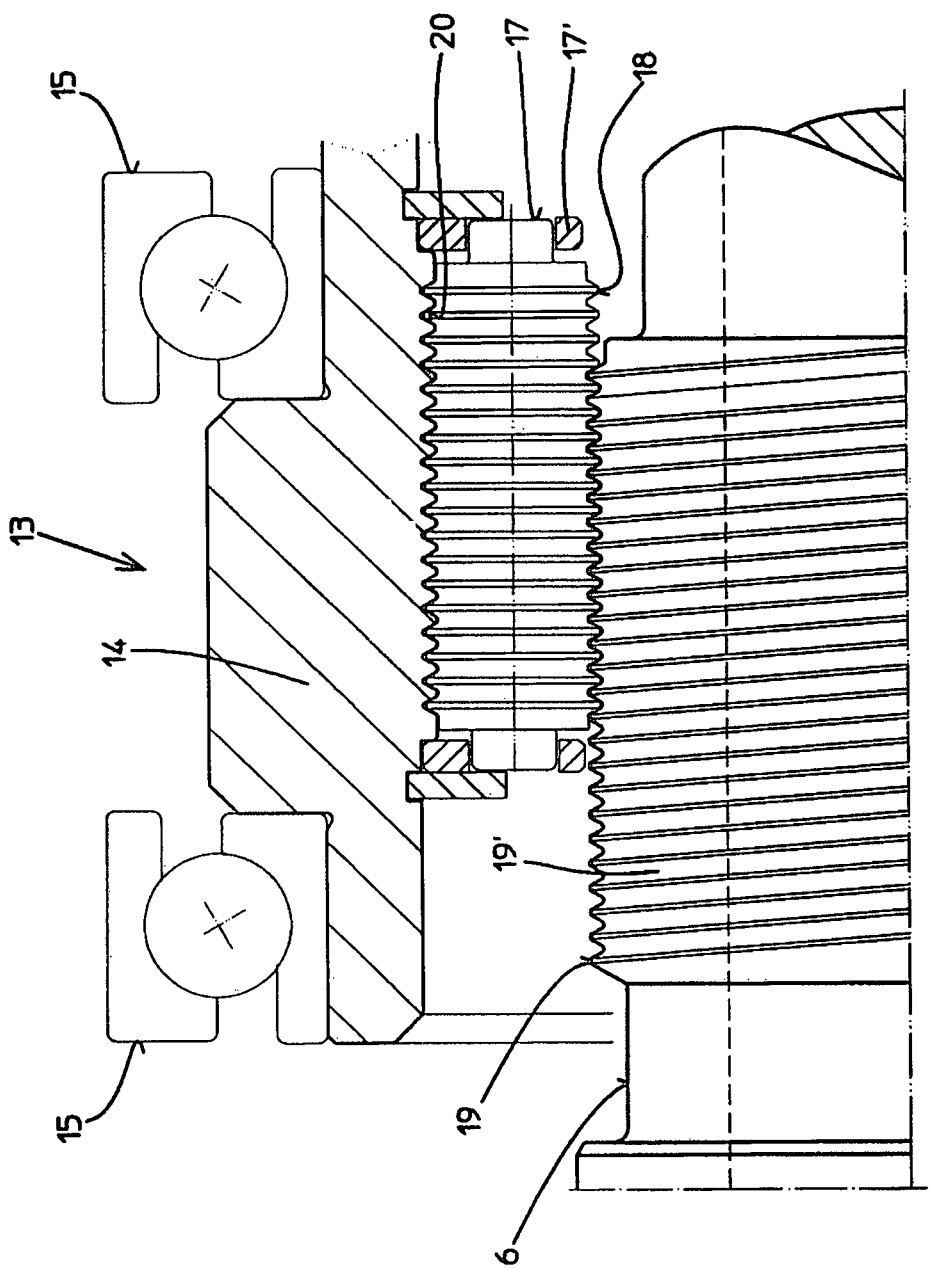

CLAMPING UNIT

BACKGROUND OF THE INVENTION

1. Field of the Invention

The present invention relates to a clamping unit for machine tools with a housing that can be connected to a machine spindle in a rotationally fixed arrangement, and a screw drive arranged in the housing, wherein the screw drive interacts with a draw rod linked to a power chuck, by means of which rotational movements transmitted to the clamping unit can be converted into translational adjustment movements of the draw rod.

2. Description of the Prior Art

An electrical chuck with a clamping unit of this kind is disclosed in DE 10 2007 044 309 A1. In this case, the circumferential housing only serves to support the ring gear of a harmonic drive; in this configuration, there is no transmission of the rotational movement of the machine spindle onto an actuator. Instead, the actuator takes the form of an electric motor acting on a shaft generator of the harmonic drive, by means of which the rolling screw drive of the draw rod can be driven by means of a steel bush that is provided with external gearing and a dog clutch. The rotational adjustment movements of the electric motor connected to the drive gear of the spline shaft gear unit by means of a belt drive, can be converted into translational adjustment movements of the draw rod, although the electric motor needs to be controlled according to the rotation speed and direction of rotation of the power chuck in order to trigger adjustment movements of the clamping jaws, or in order to retain or change the clamping force. In order to achieve this, so that the clamping unit can be used together with the servomotor as an electric chuck, it is necessary to have an extraordinarily complicated control device, as well as numerous programs in which a large number of parameters must be incorporated.

Quite apart from the very great control complexity, this not only leads to a high susceptibility to malfunctions, but also the investment costs, in particular for the control device and the various programs, are considerable. However, the principal disadvantage is that the control unit has to be adjusted to take account of numerous different existing conditions, thereby placing very exacting requirements on the operating personnel. As a result, the electric chuck of the prior art only has limited practical applications.

SUMMARY OF THE INVENTION

The task of the present invention is, therefore, to provide a clamping unit for machine tools for transmitting and converting movements which can be used in a very advantageous manner with electrical clamping devices in order to create an axially vectored clamping force that is directed towards the power chuck, thereby permitting safe and trouble free operation at all times over a long period. The design must be straightforward such as to allow for economical manufacture. Above all, however, the clamping unit must be capable of being used in electrical clamping devices with different configurations, and it should be possible to adjust the clamping force, even whilst the machine spindle is rotating. Furthermore, there should be no need for complicated control units and programs in order to operate the clamping unit.

In accordance with the present invention, this is achieved in a clamping unit for machine tools of the aforementioned type in that the housing is provided with an output element that is firmly connected to the housing, with rotational movements of the machine spindle being transmitted via the output element onto an actuator located after the clamping unit, in that the housing has an input element assigned to it that is mounted, in a preferred embodiment, in a rotating arrangement on the housing, with the downstream actuator acting on the input element, and in that the input element is located in a driving connection with a rotating, but axially fixed, hollow shaft by means of one or more intermediate elements, in which case the hollow shaft is supported on the housing and interacts with a screw drive.

It is advantageous for the housing to comprise a hollow body that is stepped and configured as one piece, which is closed by a cover on a side facing toward the machine spindle, and for the drive element and the input element to be secured, or in a rotating arrangement, on the side opposite the cover, preferably in the end area, in which case the cover allows the hollow shaft to be axially locked in the housing, in a preferred embodiment by means of anti-friction bearings, and for the cover to be configured with a T-shaped cross-section and for parts of the screw drive to be supported on a shoulder that protrudes into the housing.

The intermediate elements provided between the input element of the clamping unit and the screw drive can easily be arranged out-of-centre and configured as splined shafts, or as a one or multi-stage gear unit, in which case the carrier shafts of the gear unit should be mounted in an intermediate wall of the housing in a rotating arrangement, and the gears of the gear unit should be in a driving connection with a hollow shaft carrying the input element and supported in a rotating arrangement on the housing and directly with the hollow shaft assigned to the screw drive.

The screw drive of the clamping unit preferably is composed of one or more drive rollers in a rotating mounting and provided with projections arranged in parallel to one another, and of a threaded spindle arranged on the draw rod, and the drive rollers should engage with their projections in guide grooves worked into the inner jacket surface of the hollow shaft and in thread grooves of the threaded spindle, such that the threaded spindle can be axially adjusted using the drive rollers during rotation of the hollow shaft.

In a screw drive provided with several drive rollers, it is appropriate for these to be arranged evenly over the circumference and for them to be supported in end areas on both sides with one guide cage each.

The thread grooves of the threaded spindle preferably are configured as single or multi-thread grooves, and with a double thread.

Furthermore, it is advantageous for the clamping unit and/or the actuator assigned to the clamping unit to have one securing device each assigned to them, by means of which the intermediate elements of the clamping unit and/or the actuator can be blocked in the event of disruptions in operation.

Each of the securing devices can consist of a magnetic coil inserted in a separate housing, or of an adjustment piston on which a pressurised agent acts, preferably compressed air, and of a securing pin attached to an armature which can be moved axially by the adjustment piston against the force of a spring, in which case the securing pin can be inserted directly, or via intermediate elements, into openings provided on the assigned components.

In a securing device assigned to the intermediate elements, it is appropriate to have a securing pin act on a disc mounted on the housing, which pin can be moved against the force of a spring, in which case the disc is provided with a detent pin attached to it which can be inserted into openings disposed in the end face of a gear, in order to maintain the clamping force in the power chuck in the event of an electrical power failure, and/or a disruption in operation of the transmission elements of the clamping device, in which case the transmission elements of the actuator should have capacitive sensors, optical sensors, or light barriers, assigned to them, by means of which the operational status of the transmission elements can be monitored, and which are connected to the securing device assigned to the intermediate elements.

In a securing device that is assigned to an actuator provided with a circumferential housing for accommodating a step-down gear unit, the securing pin therefor should be able to be inserted directly and automatically into one of the openings disposed in the end faces of the housing, in order to maintain the clamping force in the power chuck in the event of an electrical power failure.

In a securing device that is assigned to an actuator provided with circumferential belt sheaves, however, the securing pin should interact with a belt sheave provided with openings, either directly or via a disc provided with a detent pin that can be moved axially against the force of a spring.

Furthermore, it is advantageous for the housing to be equipped with a flat or stepped contact surface on its side facing away from the power chuck for a stop shaft to be inserted into the central hole in the housing, or for a guide tube.

If a clamping unit for machine tools is embodied in accordance with the present invention, it is possible for the rotational movements of the machine spindle to be directed through the clamping unit and for the adjustment movements of differently configured electrical clamping devices to be converted into axial adjustment movements, with the help of the clamping unit, and for them to be transmitted directly to a draw rod. The design complexity required to achieve this is very low, although the principal advantage is that no complicated electrical control devices and programs are required for control purposes in order to adjust and adapt the power chuck to different operating conditions. The configuration in accordance with the proposal therefore permits safe and trouble-free operation, with straightforward handling over a long period, as well as provide for a variety of applications.

In addition, an assurance is given that if there is an electrical power failure, and/or any other kind of operational disruptions in the clamping devices, then the draw rod will be blocked immediately with the help of securing devices. Also, given coasting of the machine spindle, this ensures that the clamping force of the power chuck will not be lessened, and that the clamping jaws will not come open. In this way, accidents during operation are reliably avoidable.

BRIEF DESCRIPTION OF THE DRAWINGS

The drawings show two configuration variants of the clamping unit for machine tools configured in accordance with the present invention, the details of which are explained below. In the drawings, FIG. 3 shows the clamping unit with clamping device in accordance with FIG. 2, in a side view, and FIG. 4 shows the screw drive used in the clamping unit in accordance with FIGS. 1 and 2, in a magnified view and in an axial section.

DESCRIPTION OF THE PREFERRED EMBODIMENTS

Figure 1:
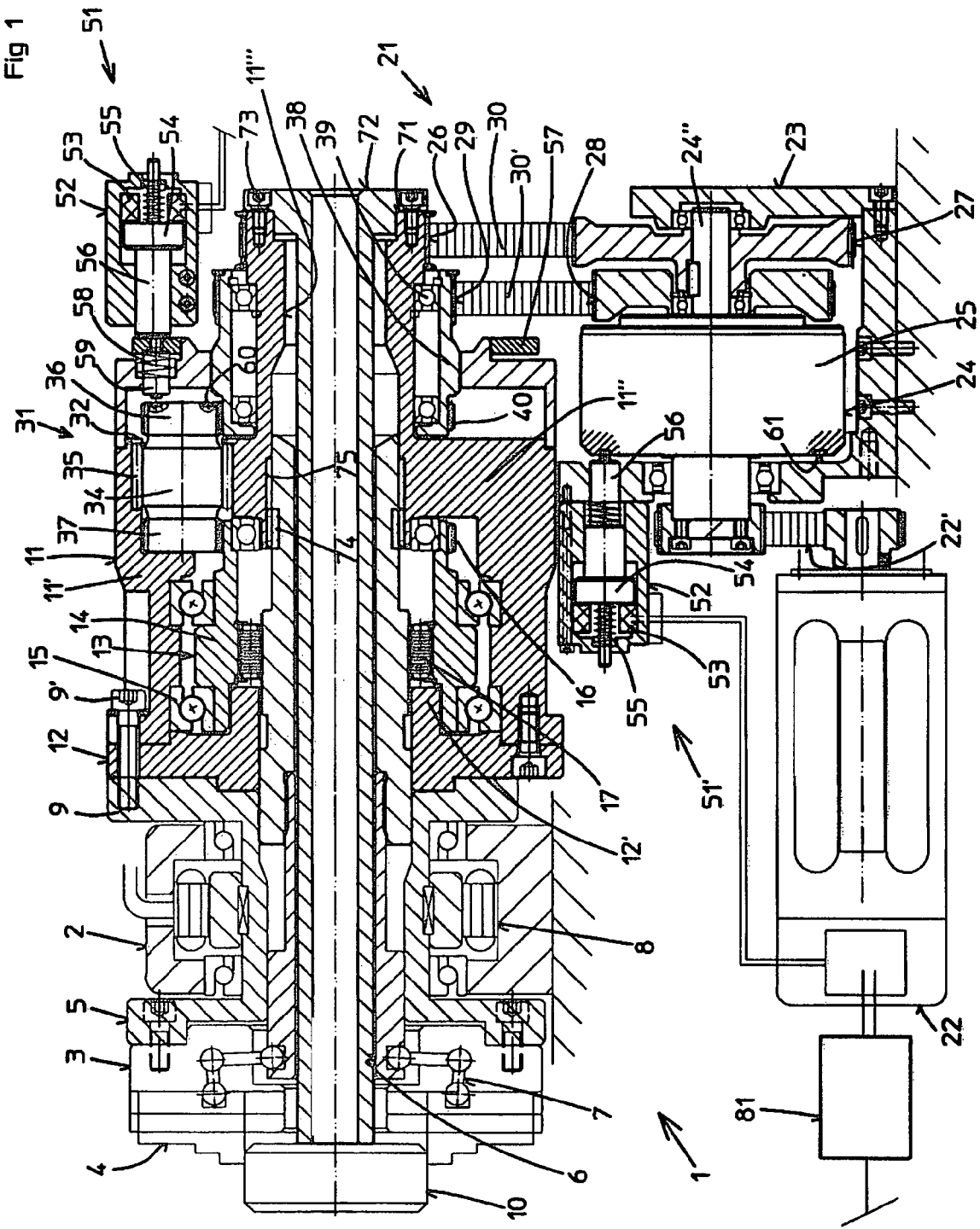
FIG. 1 shows the clamping unit mounted on a machine spindle of a machine tool, with an electrical clamping device as an actuator, in an axial section.
Figure 2:
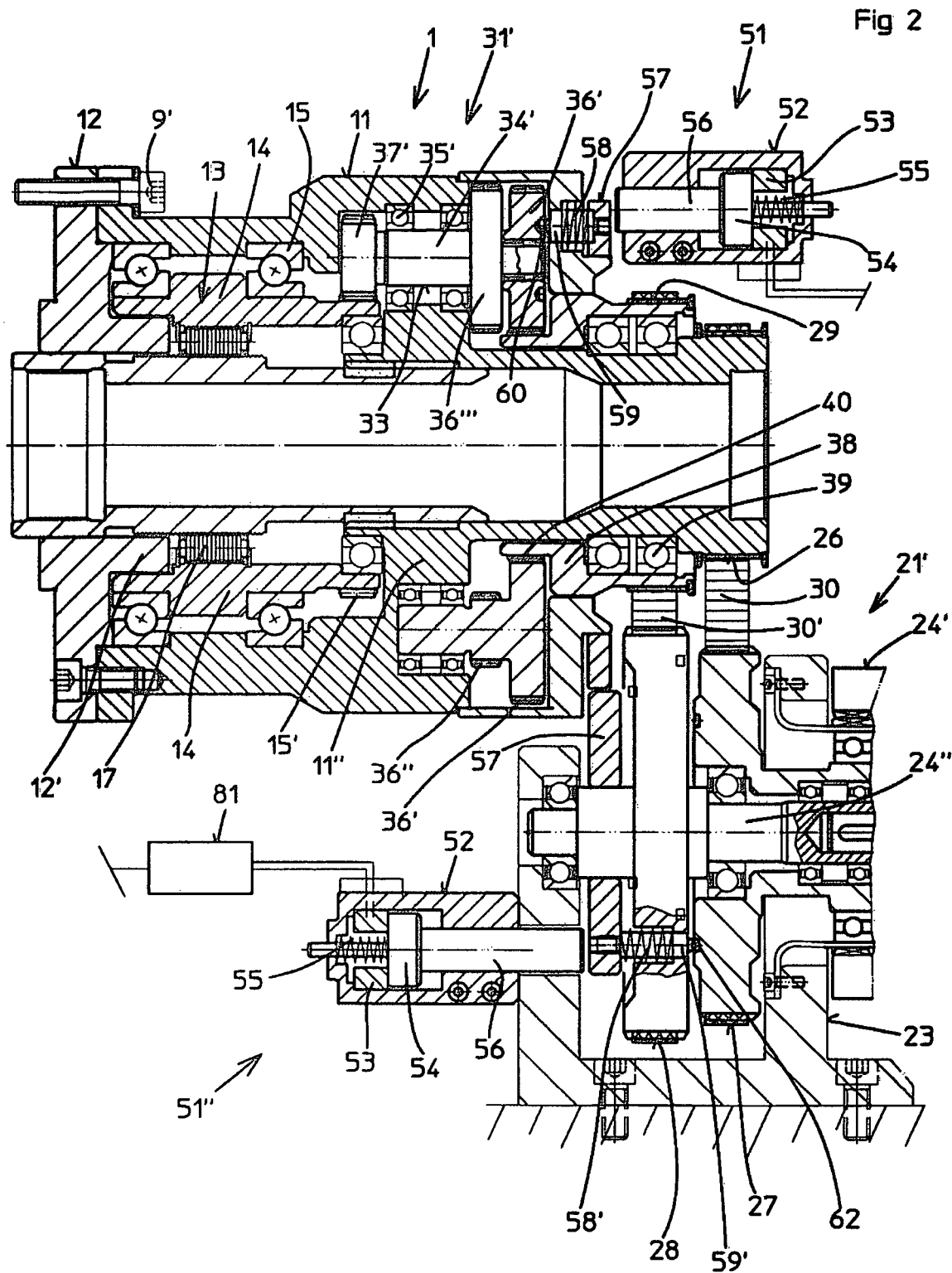
FIG. 2 shows the clamping unit in accordance with FIG. 1, with a different kind of electrical clamping device and a different intermediate element.

The clamping unit 1 illustrated in FIGS. 1 and 2, is used for transmitting a rotational movement of a machine spindle 5 of a machine tool 2 onto an actuator 21 or 21' configured as an electrical clamping device, as well as for converting the rotational adjustment movements supplied by the actuators 21, 21' to the clamping unit 1, into translational movements which are to be supplied to a power chuck 3 arranged on the machine tool 2, in which case a workpiece 10 is clamped in the power chuck 3 for the purpose of machining. The power chuck 3 is provided with radially adjustable clamping jaws 4 for this purpose, which can be adjusted via relay levers 7 by means of a draw rod 6 that can be actuated in an axial direction.

The clamping unit 1 comprises a housing 11 which is attached by bolts 9' to a flange 9 provided on the machine spindle 5, and of a screw drive 13 that is in a driving connection with the actuator 21 or 21', as well as the draw rod 6 by means of an intermediate element 31 or 31'. The housing 11, which is configured as a stepped hollow shaft 11' and is closed by a T-shaped cover 12, is firmly coupled to the machine spindle 5, adapted to be driven by an electric motor 8, and the housing 11 rotates in conjunction with the spindle 5. In addition, an output element in the form of a belt sheave 26 is arranged on the housing 11 in the end area opposite to the flange 9, by means of which the rotational movements of the machine spindle 5 are transmitted to the actuator 21 or 21'. A wedge 74 guided in a longitudinal groove 75 worked into the hollow shaft 11', also connects the housing 11 in a rotationally fixed arrangement to the axially movable draw rod 6.

As shown in detail in FIG. 4, the screw drive 13 is provided with a hollow shaft 14 which is supported in a rotating, but axially immobile, arrangement in the housing 11 by means of bearings 15, as well as several drive rollers 17, which are held in guide cages 17' supported on the hollow shaft 14, and which engage in a threaded spindle 19 arranged on the draw rod 6. Projections 18 arranged in parallel to one another, which interact with guide grooves 20 worked into the inner jacket surface of the hollow shaft 14, provide a driving connection between the drive rollers 17 and the hollow shaft 14. If the hollow shaft 14 is driven, then the drive rollers 17 are set rotating and, by means of their projections 18, which engage tangentially in thread grooves 19' worked into the threaded spindle 19, they are pushed to the right, or the left, to a greater or lesser extent, depending on the direction of rotation of the hollow shaft 14 and the selected pitch of thread grooves 19'. A shoulder 12' of the cover 12 projecting into the housing 11 also supports the screw drive 13, and in particular the drive rollers 17.

The actuator 21 is provided with a servomotor adapted to act on a gear unit 25, installed in a housing 24, by means of a belt drive 22'. An output shaft 24' of the gear unit 25 in this case is mounted in a stationary carrier 23, and two belt sheaves 27 and 28 are supported on the output shaft 24' which interact via drive belts 30 and 30' with belt sheaves 26 and 29 that are attached to the housing 11, or to a hollow shaft 38, arranged in a rotating mounting by means of bearings 39. As a result, the rotational movements of the machine spindle 5 are transmitted from the housing 11 via the belt sheave 26 as the input element, and the drive belt 30 onto the belt sheave 27. The signals sent by a servomotor 22 and the gear unit 25, depending on the signals sent by a control unit 81 to the servomotor 22, effect adjustment movements triggered for increasing or reducing the clamping force in the power chuck 3 and for changing the position of the clamping jaws 4, and are transmitted via the belt sheaves 28 and 29 as input element of the clamping unit 1, as well as via the drive belt 30' onto the hollow shaft 38.

In order to transmit the adjustment movements further, the hollow shaft 38 is provided with gearing 40 which, as is shown in FIG. 1, interacts with a gear 36 of the intermediate elements 31, a plurality of which are provided. Each of the gears 36 disposed in a shaft 34 are mounted in a rotating arrangement off-centre in the hollow shaft 11" of the housing 11 by means of bearings 35 and carry an additional gear 37 which engages with gearing 16 worked into the hollow shaft 14 of the screw drive 13. The rotational adjustment movements of the servomotor 22 are therefore converted into axial adjustment movements of the draw rod 6 by means of the screw drive 13.

In a different embodiment of the actuator 21, as shown in FIG. 2, the servomotor on the motor shaft 24" on which the belt sheaves 27 and 28 are arranged, is not shown. Also, the intermediate element 31' is configured as a two-stage step-down gear unit 33, the gears 36''' and 37' of which are in turn arranged on a shaft 34'. The gear 36' which interacts with the hollow shaft 38 is in a driving connection with the gear 36''' by means of another gear 36'' mounted in the intermediate wall 11'' of the housing 11 in a rotating arrangement. In this way, it is possible to achieve a significant step-down ratio of the input rotational movements.

In order to maintain the clamping force in the power chuck 3 in the event of an electrical power failure, and/or any kind of operational disruptions in the area of the actuator 21 or 21', for example, in case of a breakage of the drive belts 30 and/or 30', with the effect that during coasting of the machine spindle 5 no change in the clamping status of the clamping jaws 4 can be occasioned, the clamping unit 1, as well as the actuators 21 or 21', are each provided with a securing device 51 or 51' or 51". The securing devices 51, 51' and 51" in this case principally comprise a separate housing 52 located in a stationary position, in which a magnetic coil 53 and an armature 54, that can be actuated by the coil 53, are located. The armature 54 is adapted to be adjusted against the force of a compression spring 55 and is provided with a securing pin 56, which can be inserted into openings 60, 61 or 62 in the corresponding assigned component, either directly or by means of intermediate elements.

In the securing device 51, shown in FIG. 1, the securing pin 56 acts on a disc 57, which is mounted on the housing 11, and can be moved against the force of a compression spring 58, and has another pin 59 attached to it, which can be inserted into one of the openings 60 disposed in the gear 36. If the magnetic coil 53 is energised, this holds the armature 54 in the operating position indicated, against the force of the spring 55. However, if there is an electrical power failure and no more magnetic force is exerted on the armature 54, the force of the spring 55 immediately pushes the armature 54 and presses it against the disc 57 which is also moved, together with the pin 59 that the disc 57 carries. This causes the pin 59 to engage in one of the openings 60 provided in the gear 36 or 36', such that the intermediate element 31 or 31', and the components connected thereto, namely the screw drive 13 and the draw rod 6, are blocked, with the effect that it is not possible for the clamping jaws 4 of the power chuck 3 to change their positions, and therefore the clamping status cannot be changed, even when the machine spindle 5 is coasting.

The securing device 51' is assigned to the gear unit 25 of the clamping device 1 and has the same structure. In this case, the securing pin 56 engages directly in one of the openings 61 worked directly into an end face of the housing 11, with the effect that the actuator 21 is blocked in this way and there cannot be any adjustment of the clamping jaws 4 of the power chuck.

The securing device 51", shown in FIG. 2, interacts with the belt sheave 28 of the actuator 21' to maintain the tension in the power chuck 3 in the event of an electrical power failure and/or other operational disruption. A disc 57' moveable axially against the force of a spring 58', against which a securing pin 56' of the securing device 51" is pressed in case of an electrical power failure, in turn moves a pin 59' against the force of the spring 58', and the pin 59' is adapted to engage in one of the openings 62 provided in the belt sheave 29.

In order to monitor the operational status of the drive belts 30 and/or 30', capacitive sensors 63 or 64 are assigned to them as shown in FIG. 3, the signals of which are sent to the securing device 51 via signal cables 65. In the event of a break in drive belts 30 and/or 30', the clamping unit 1 is blocked, providing a reliable means of preventing accidents caused by the workpiece 10 in the power chuck 3 coming loose.

The housing 11 is configured as a hollow body 11', and therefore has a central hole, which means it is possible to arrange a stop shaft 72 or a guide tube in the housing 11 and the draw rod 6 whilst machining rod stock. As a result, workpieces 10 clamped in the power chuck 3, or rods passing through the clamping unit 1, are supported by the stop shaft 72 or a guide tube. A stepped contact surface 71 is disposed in the hollow body 11' for this purpose, and the stop shaft 72 makes contact with it. Bolts 73 secure the stop shaft 72 on the hollow body 11'.

It is possible for the clamping unit 1 to be followed by actuators with an alternative configuration, e.g. in the form of an electric motor, in order to convert the actuator movements in the clamping unit 1 into axial adjustment movements for the draw rod 6.

The invention claimed is:

1. A clamping unit for machine tools, the clamping unit comprising a housing adapted to be connected to a machine spindle in a rotationally fixed arrangement, and a screw drive arranged in the housing, wherein the screw drive interacts with a draw rod linked to a power chuck, by means of which rotational movements transmitted to the clamping unit are converted into translational adjustment movements of the draw rod;

wherein, the housing is provided with an output element connected to the housing, with rotational movements of a machine spindle being transmitted via the output element onto an actuator disposed adjacent the clamping unit, and the housing is provided with an input element mounted, in a rotating arrangement on the housing, with the actuator acting on the input element, the input element being disposed in a driving connection with a rotating but axially fixed hollow shaft by intermediate element means, wherein the hollow shaft is supported on the housing and interacts with the screw drive;

wherein the housing comprises a hollow body stepped and configured as one piece and closed by a cover on a side facing towards the machine spindle, and the output element and the input element are secured, or in a rotating arrangement, on a side opposite the cover in an end area;

wherein the cover allows the hollow shaft to be axially locked in the housing by means of anti-friction bearings; and wherein the cover is configured with a T-shaped cross-section and parts of the screw drive are supported on a shoulder that protrudes into the housing.

2. The clamping unit in accordance with claim 1, wherein the intermediate elements provided between the input element of the clamping unit and the screw drive are arranged out-of-centre and configured as one of splined shafts and a multi-stage gear unit, in which case carrier shafts of the gear unit are mounted in an intermediate wall of the housing in a rotating arrangement, and gears of a gear unit are in a driving connection with a hollow shaft carrying the input element and supported in a rotating arrangement on the housing and with the hollow shaft that is assigned to the screw drive.

3. The clamping unit in accordance with claim 1, wherein the screw drive of the clamping unit comprises at least one drive roller in a rotating mounting and provided with projections arranged in parallel to one another, and a threaded spindle arranged on the draw rod, and said drive rollers engage with the projections in guide grooves disposed in the inner jacket surface of the hollow shaft and in thread grooves of a threaded spindle, such that the threaded spindle is axially adjustable using said drive rollers during rotation of the hollow shaft.

4. The clamping unit in accordance with claim 3, wherein the screw drive is provided with said drive rollers, and said rollers are disposed evenly over the circumferences thereof, and are supported in end areas on both sides with one guide cage each.

5. The clamping unit in accordance with claim 3, wherein the thread grooves of the threaded spindle are configured with a double thread.

6. The clamping unit in accordance with claim 1, wherein a selected one of the clamping unit and the actuator assigned to the clamping unit is provided with a securing device, by means of which the intermediate elements of the clamping unit and the actuator are adapted to be blocked in the event of disruptions in operation.

7. The clamping unit in accordance with claim 6, wherein each of the securing devices comprises a magnetic coil inserted in a separate housing and an armature or an adjustment piston on which compressed air acts, and a securing pin attached to the armature and which can be moved axially by the adjustment piston against a force of a spring, such that the securing pin is insertable directly, or via intermediate elements, into openings provided on the clamping unit and the actuator.

8. The clamping unit in accordance with claim 7, wherein in the securing device assigned to each of the intermediate elements, the securing pin is adapted to act on a disc mounted on the housing and can be moved against a force of a spring, the disc having a detent pin attached thereto and which is adapted to be inserted into openings disposed in an end face of a gear, in order to maintain clamping force in the power chuck in the event of an electrical power failure and/or a disruption in operation of the actuator.

9. The clamping unit in accordance with claim 8, wherein transmission elements of the actuator have a selected one of capacitive sensors, optical sensors, and light barriers assigned to them, by means of which an operational status of the transmission elements can be monitored, and which are connected to the securing device assigned to the intermediate elements.

10. The clamping unit in accordance with claim 7, wherein in a securing device that is assigned to an actuator provided with circumferential belt sheaves, the securing pin interacts with a belt sheave provided with openings the securing pin being adapted to be moved axially against the force of a spring.

11. The clamping unit in accordance with claim 6, wherein in a securing device that is assigned to an actuator provided with a circumferential housing for accommodating a step-down gear unit, a securing pin is adapted to be inserted directly and automatically into one of openings worked into end faces of the housing in order to maintain clamping force in the power chuck in the event of an electrical power failure.

12. A clamping unit for machine tools, the clamping unit comprising a housing adapted to be connected to a machine spindle in a rotationally fixed arrangement, and a screw drive arranged in the housing, wherein the screw drive interacts with a draw rod linked to a power chuck, by means of which rotational movements transmitted to the clamping unit are converted into translational adjustment movements of the draw rod;

wherein, the housing is provided with an output element connected to the housing, with rotational movements of a machine spindle being transmitted via the output element onto an actuator disposed adjacent the clamping unit, and the housing is provided with an input element mounted, in a rotating arrangement on the housing, with the actuator acting on the input element, the input element being disposed in a driving connection with a rotating but axially fixed hollow shaft by intermediate element means, wherein the hollow shaft is supported on the housing and interacts with the screw drive; and wherein the housing is provided with a selected one of a flat and stepped contact surface on a side thereof facing away from the power chuck and adapted to receive a stop shaft insertable into a central hole in the housing.

13. A clamping unit for machine tools, the clamping unit comprising a housing adapted to be connected to a machine spindle in a rotationally fixed arrangement, and a screw drive arranged in the housing, wherein the screw drive interacts with a draw rod linked to a power chuck, by means of which rotational movements transmitted to the clamping unit are converted into translational adjustment movements of the draw rod;

wherein, the housing is provided with an output element connected to the housing, with rotational movements of a machine spindle being transmitted via the output element onto an actuator disposed adjacent the clamping unit, and the housing is provided with an input element mounted, in a rotating arrangement on the housing, with the actuator acting on the input element, the input element being disposed in a driving connection with a rotating but axially fixed hollow shaft by intermediate element means, wherein the hollow shaft is supported on the housing and interacts with the screw drive; and wherein a selected one of the clamping unit and the actuator assigned to the clamping unit is provided with a securing device, by means of which the intermediate elements of the clamping unit and the actuator are adapted to be blocked in the event of disruptions in operation.

14. The clamping unit in accordance with claim 13, wherein each of the securing devices comprises a magnetic coil inserted in a separate housing and an armature or an adjustment piston on which compressed air acts, and a securing pin attached to the armature and which can be moved axially by the adjustment piston against a force of a spring, such that the securing pin is insertable directly, or via intermediate elements, into openings provided on the clamping unit and the actuator.

15. The clamping unit in accordance with claim 14, wherein in the securing device assigned to each of the intermediate elements, the securing pin is adapted to act on a disc mounted on the housing and can be moved against a force of a spring, the disc having a detent pin attached thereto and which is adapted to be inserted into openings disposed in an end face of a gear, in order to maintain clamping force in the power chuck in the event of an electrical power failure and/or a disruption in operation of the actuator.

16. The clamping unit in accordance with claim 15, wherein transmission elements of the actuator have a selected one of capacitive sensors, optical sensors, and light barriers assigned to them, by means of which an operational status of the transmission elements can be monitored, and which are connected to the securing device assigned to the intermediate elements.

17. The clamping unit in accordance with claim 14, wherein in a securing device that is assigned to an actuator provided with circumferential belt sheaves, the securing pin interacts with a belt sheave provided with openings the securing pin being adapted to be moved axially against the force of a spring.

18. The clamping unit in accordance with claim 13, wherein in a securing device that is assigned to an actuator provided with a circumferential housing for accommodating a step-down gear unit, a securing pin is adapted to be inserted directly and automatically into one of openings worked into end faces of the housing in order to maintain clamping force in the power chuck in the event of an electrical power failure.

* * * * *